(12) United States Patent
Reynolds et al.

(10) Patent No.: US 10,344,538 B2
(45) Date of Patent: Jul. 9, 2019

(54) SUPPORT CLAMP

(71) Applicant: Austin Engineering USA Services, Inc., Casper, WY (US)

(72) Inventors: Frederick J. Reynolds, Casper, WY (US); Wayne D. Soule, Casper, WY (US); Elvis E. Dean, Casper, WY (US)

(73) Assignee: AUSTIN ENGINEERING USA SERVICES, INC., Casper, WY (US)

( * ) Notice: Subject to any disclaimer, the term of this patent is extended or adjusted under 35 U.S.C. 154(b) by 0 days.

(21) Appl. No.: 15/399,944

(22) Filed: Jan. 6, 2017

(65) Prior Publication Data
US 2017/0198529 A1 Jul. 13, 2017

Related U.S. Application Data

(60) Provisional application No. 62/277,725, filed on Jan. 12, 2016.

(51) Int. Cl.
| | |
|---|---|
| *F16L 3/10* | (2006.01) |
| *E21B 15/00* | (2006.01) |
| *F16B 2/06* | (2006.01) |
| *F16M 13/02* | (2006.01) |
| *E21B 43/12* | (2006.01) |

(52) U.S. Cl.
CPC ............. *E21B 15/00* (2013.01); *F16B 2/065* (2013.01); *F16M 13/02* (2013.01); *E21B 43/121* (2013.01)

(58) Field of Classification Search
CPC ..... F16L 3/1016; F16L 3/1091; F16L 21/065; F16L 59/024
See application file for complete search history.

(56) References Cited

U.S. PATENT DOCUMENTS

| | | | | |
|---|---|---|---|---|
| 1,646,639 A | * | 10/1927 | Crowell ................. | E21B 19/10 166/93.1 |
| 2,942,820 A | * | 6/1960 | Sherburne .............. | F16L 3/00 248/62 |
| 3,589,657 A | * | 6/1971 | Pendley .................. | F16L 1/10 248/230.1 |
| 4,417,755 A | * | 11/1983 | Gittleman .............. | F16L 21/065 285/367 |
| 5,605,357 A | * | 2/1997 | Bird ...................... | F16L 55/172 285/15 |
| 5,727,762 A | * | 3/1998 | Cosentino ............. | F16L 3/1016 248/154 |
| 7,140,579 B2 | * | 11/2006 | Kirschner .............. | F16L 3/1016 248/74.1 |
| 7,540,540 B2 | * | 6/2009 | Kwon ................... | F16L 21/065 285/411 |
| 7,988,207 B2 | * | 8/2011 | Dole ..................... | F16L 17/04 285/112 |

(Continued)

*Primary Examiner* — Bradley Duckworth
(74) *Attorney, Agent, or Firm* — ColterJennings

(57) ABSTRACT

A clamp for supporting an apparatus, such as a pump, a motor, or other mechanism to be lowered into a drill hole includes two coupling halves connected together using a bolts and nuts. Each half has a semicircular interior that forms a cylinder when two halves are connected to each other. Protrusions in the semi-circular interiors mate with indentations in the pump wall to support the pump. Chains or other devices attach to eyelet bolts or to a pivoting bail affixed on top of the coupling halves so that the clamp and the pump may be raised or lowered by external lifting apparatus.

8 Claims, 15 Drawing Sheets

(56) References Cited

U.S. PATENT DOCUMENTS

| | | | | |
|---|---|---|---|---|
| 8,047,476 B2* | 11/2011 | Van Walraven | ...... | F16L 3/1016 248/58 |
| 8,100,368 B2* | 1/2012 | Jackson | ................ | F16L 3/1016 248/317 |
| 8,276,854 B2* | 10/2012 | Mominee | .............. | F16L 3/1016 248/62 |
| 8,550,411 B2* | 10/2013 | Hiss | ......................... | H02G 3/32 248/230.5 |
| 8,562,029 B2* | 10/2013 | Louvain-Walters | .... | E21B 17/01 285/373 |
| 9,038,968 B2* | 5/2015 | Hennon | ................ | F16L 3/1091 248/65 |
| 9,194,516 B2* | 11/2015 | Beagen, Jr. | ............. | F16L 23/04 |
| 2005/0061925 A1* | 3/2005 | Kirschner | ............ | F16L 3/1016 248/49 |
| 2016/0076681 A1* | 3/2016 | Blease | .................... | F16L 17/04 285/91 |
| 2016/0334044 A1* | 11/2016 | Koenig | ................ | F16L 55/035 |
| 2017/0191588 A1* | 7/2017 | Edwards | ............... | F16L 21/065 |

\* cited by examiner

SUPPORT CLAMP

CROSS REFERENCE TO RELATED APPLICATION

This application claims priority based on U.S. Provisional Patent Application Ser. No. 62/277,725 filed Jan. 12, 2016 and titled "SUPPORT CLAMP," the disclosure of which is incorporated herein by this reference.

BACKGROUND

This disclosure relates to a clamp for suspending pumps and associated artificial lift apparatus. In particular, this disclosure relates to a clamp useful to suspend a pump or motor above a drill hole to permit the pump or motor to be lowered into the drill hole so that fluid may be pumped out of the drill hole.

After drilling has found water or oil, it is necessary to bring the fluid to the surface. Thus, various apparatuses, such as a pump, a motor, or some other mechanism or device, may need to be lowered into the drill hole. Often a second apparatus, such as a motor, is also lowered into the drill hole to drive the first apparatus. Supporting the apparatuses while lowering them into the hole can be problematic.

For example, in a typical environment, a long, cylindrical pump is supported by chains or other devices attached to the drilling structure. That support must be secure to lift and to hold the pump lest the pump be lost down the drill hole. Typically, the pump is cylindrical, meaning the support device must include a cylindrical attachment of some sort.

Furthermore, the support structure for the pump (or other apparatus) must be attachable and detachable from the pump. As a result, prior support structures often included several parts. For example, the pump or motor is connected to, and therefore supported by, the drill mast using some form of a connector, which connector in turn is held on the pump by a series of bolts, nuts, flat extensions, loops, and chains. This supporting structure may be difficult to assemble in the field, and results in numerous small (and not that small) parts, one (or many) of which can be lost, misplaced, or otherwise end up loose on the drilling platform. In a high stress environment, loose metal parts can be dangerous.

SUMMARY

The present disclosure provides a support clamp that overcomes many of the shortfalls of prior designs. The present clamp quickly and simply attaches to an apparatus, such as a pump or motor, and can be easily detached from the pump or motor. The clamp is simple in structure, has few parts, and the parts are relatively inexpensively manufactured.

The present clamp includes two generally identical coupling halves that are bolted together when secured to an apparatus, such as a pump. The coupling halves are connected to each other, and mounted around the pump, by lug bolts and lug nuts. A lug bolt may be permanently mounted to each coupling half to reduce the number of spare items or loose parts around the drilling platform.

Each coupling half is unitary in structure, but may be seen as having three parts or portions. A flat flange on one end of each half has a lug bolt hole for allowing the lug bolt to pass through the flange. When two halves are placed against each other, lug nuts may be threaded unto the two lug bolts to connect the coupling halves.

An intermediate body portion formed adjacent the flange has a generally semi-circular interior mounting surface that forms a semi-circular cylinder to accept half of the cylinder of a pump or motor or other apparatus. The interior mounting surface includes a protrusion extending radially along the interior mounting surface. The protrusion mates with a circular groove on the pump or motor (or other apparatus) to suspend the pump or motor when the clamp is in use. The body has an exterior side that forms an arc near the flange, but after a quarter circle, the exterior side transitions along a tangent line, thereby increasing the radial thickness of the coupling half.

A block forms the other end of the coupling half. The block has an inner mating face, and an angled outer face that is an extension of the tangent line. A pre-formed lug bolt bore passes through the block from the outer face to the inner mating face. In one embodiment, an eyelet bore formed in the top of the block permits mounting of an eyelet ring in the eyelet bore with the eyelet ring extending up from the block.

According to another embodiment, a pivoting link welded to the top of the block holds an upwardly extending pivoting bail. Welding the pivoting link permits the clamp to be smaller, because no eyelet bore is required, and thus the pivoting link may be welded directly or nearly directly above the lug bolt bore. Chains affixed to the eyelet ring or the pivoting bail support the clamp when in use.

To attach the clamp to a pump or motor or other apparatus, two coupling halves are placed around the diameter of the pump or motor with the eyelet rings or the pivoting bail of each clamp extending towards the top. Each lug bolt bore in the blocks of the two coupling halves is aligned with the lug bolt holes in the flanges of the other coupling half, allowing a lug bolt to be inserted through the block of one coupling half and the flange of another, and a second lug bolt to be inserted through the flange of one coupling half and the block of the other coupling half. Lug nuts are threaded onto the two lug bolts for connecting the two coupling halves. In other embodiments, the lug bolts are permanently mounted to the blocks, resulting in fewer loose parts as well as making it easier to align the lug bolt bores with the lug bolt holes, because the lug bolts may be simply inserted into the lug bolt holes.

BRIEF DESCRIPTION OF THE DRAWINGS

Other features and advantages of the present disclosure will be apparent from reference to the following Detailed Description taken in conjunction with the accompanying Drawings, in which.

DETAILED DESCRIPTION

Figure 1:
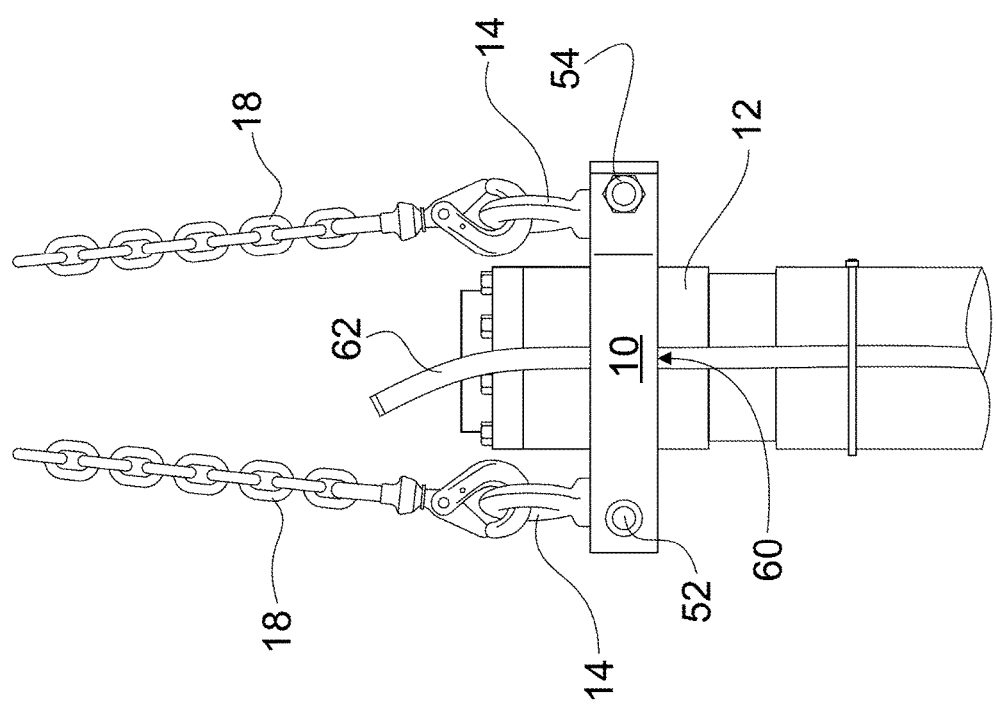
FIG. 1 depicts a side view of a clamp according to one embodiment of the present disclosure supporting a pump or other apparatus on a drilling mast or other support structure.
Figure 2:
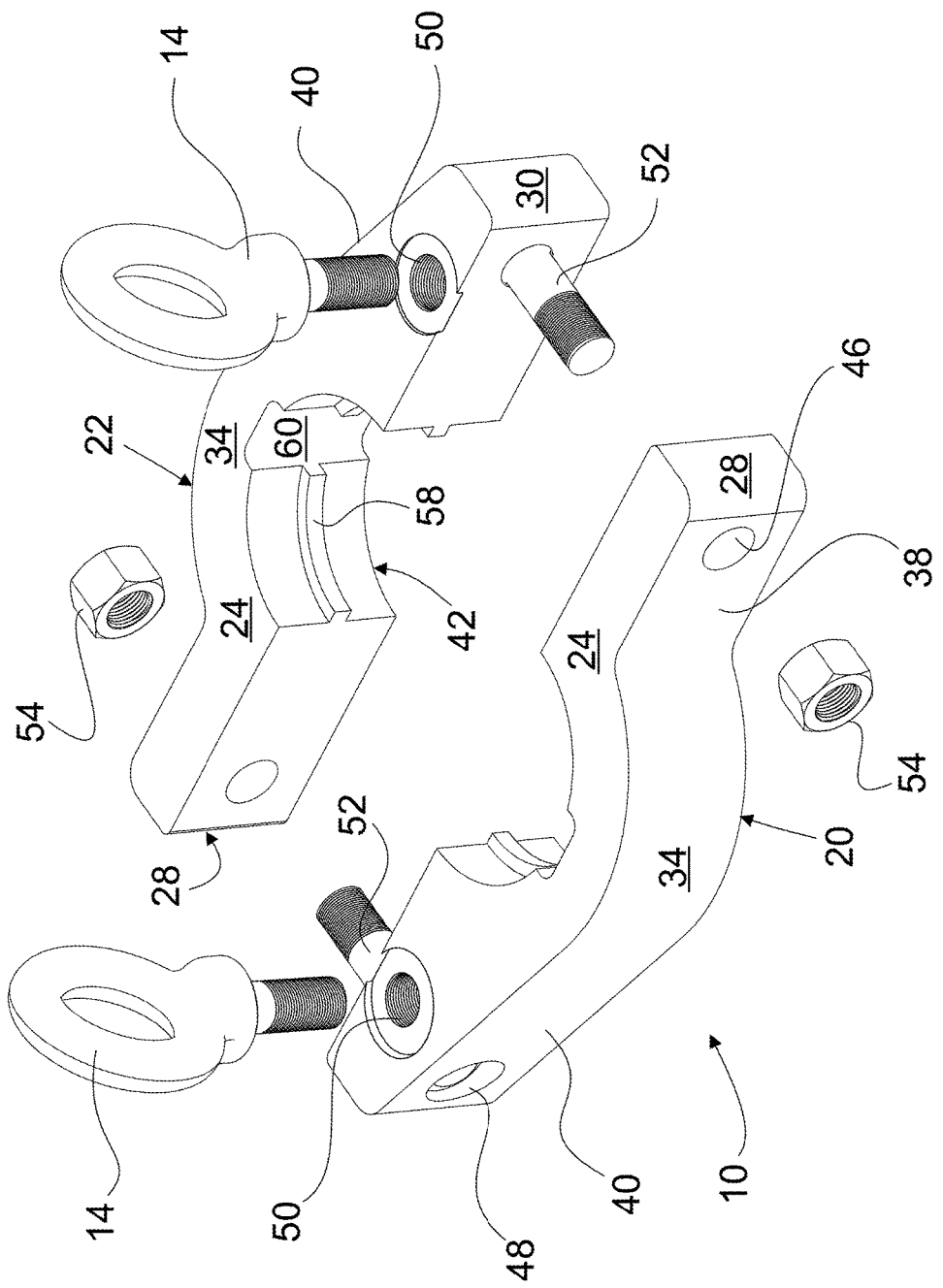
FIG. 2 depicts an exploded perspective view of the clamp depicted in FIG. 1.
Figure 3:
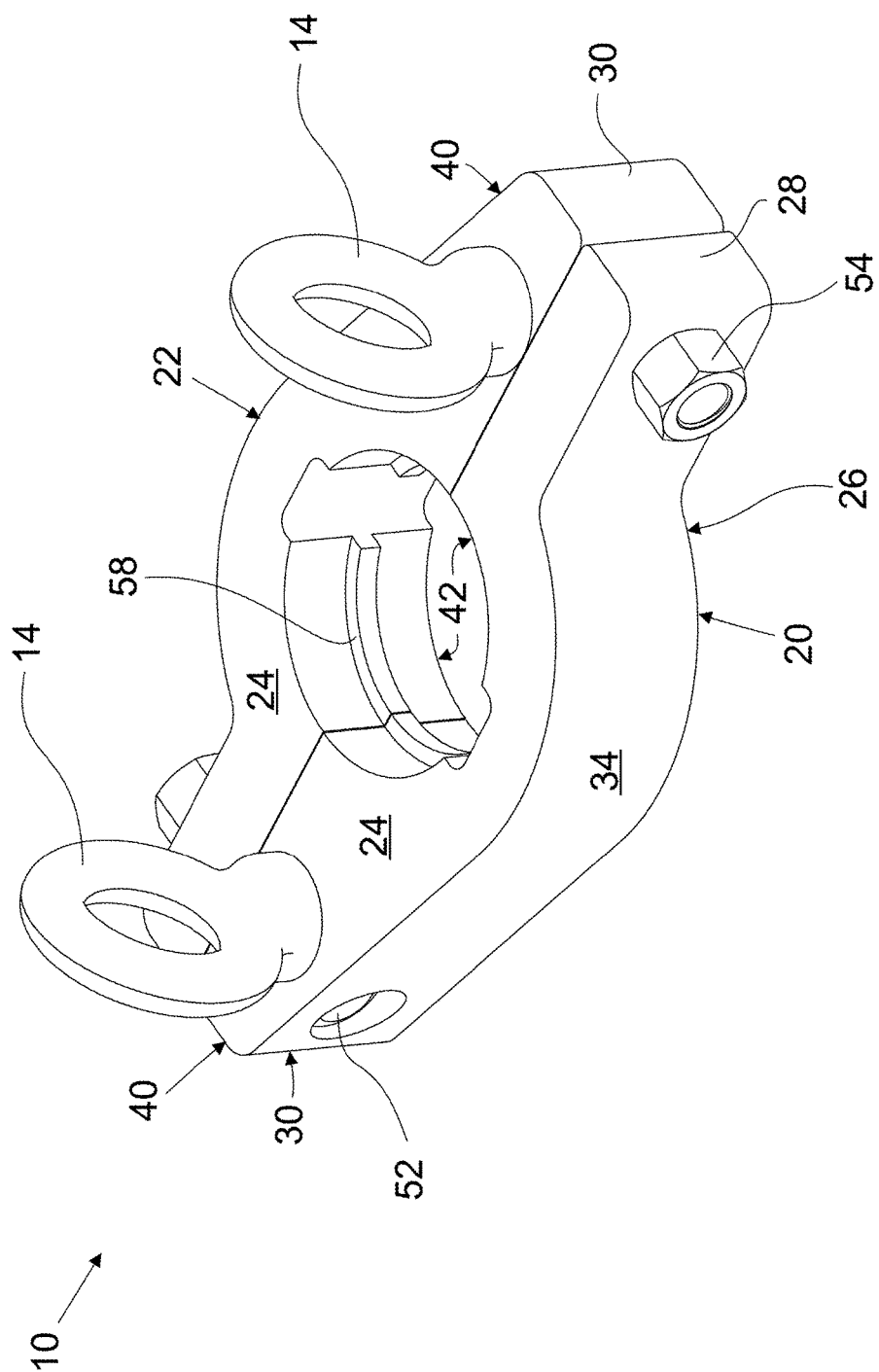
FIG. 3 depicts a perspective view of the clamp depicted in FIG. 1.
Figure 4:
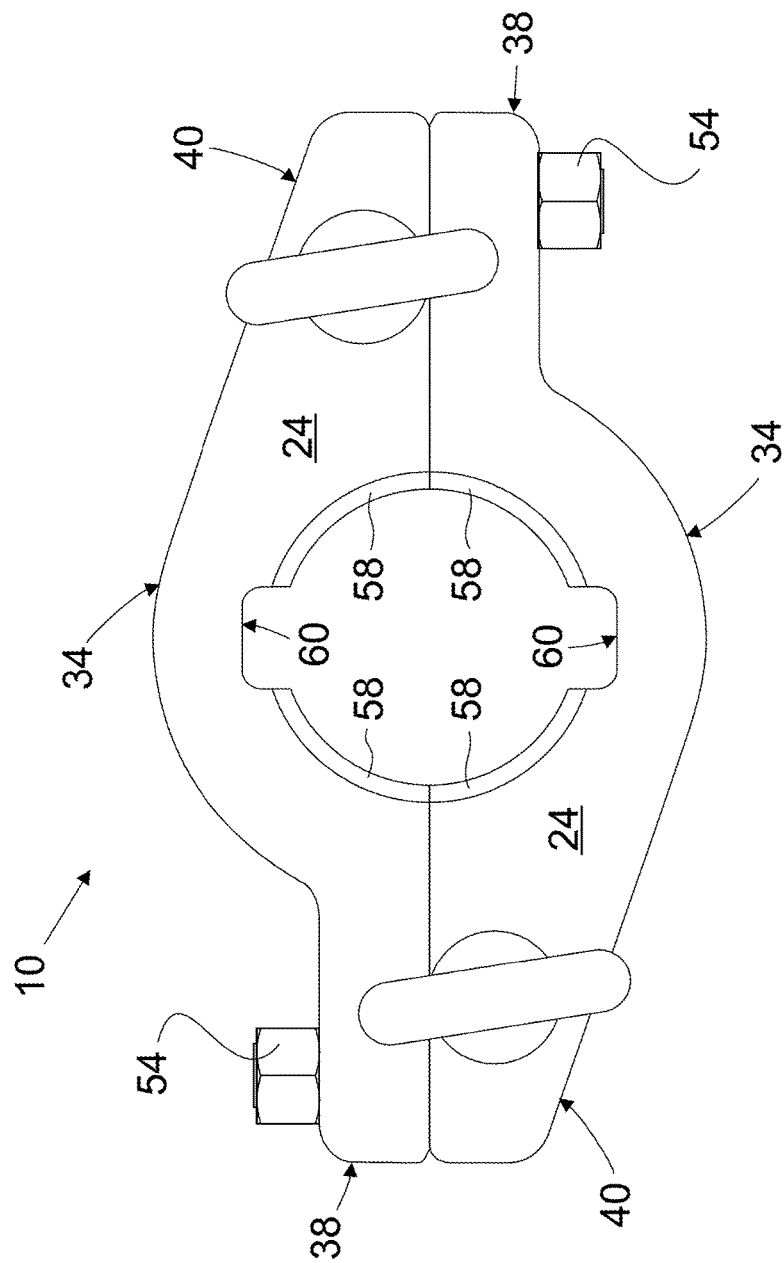
FIG. 4 depicts a top view of the clamp depicted in FIG. 1.
Figure 5:
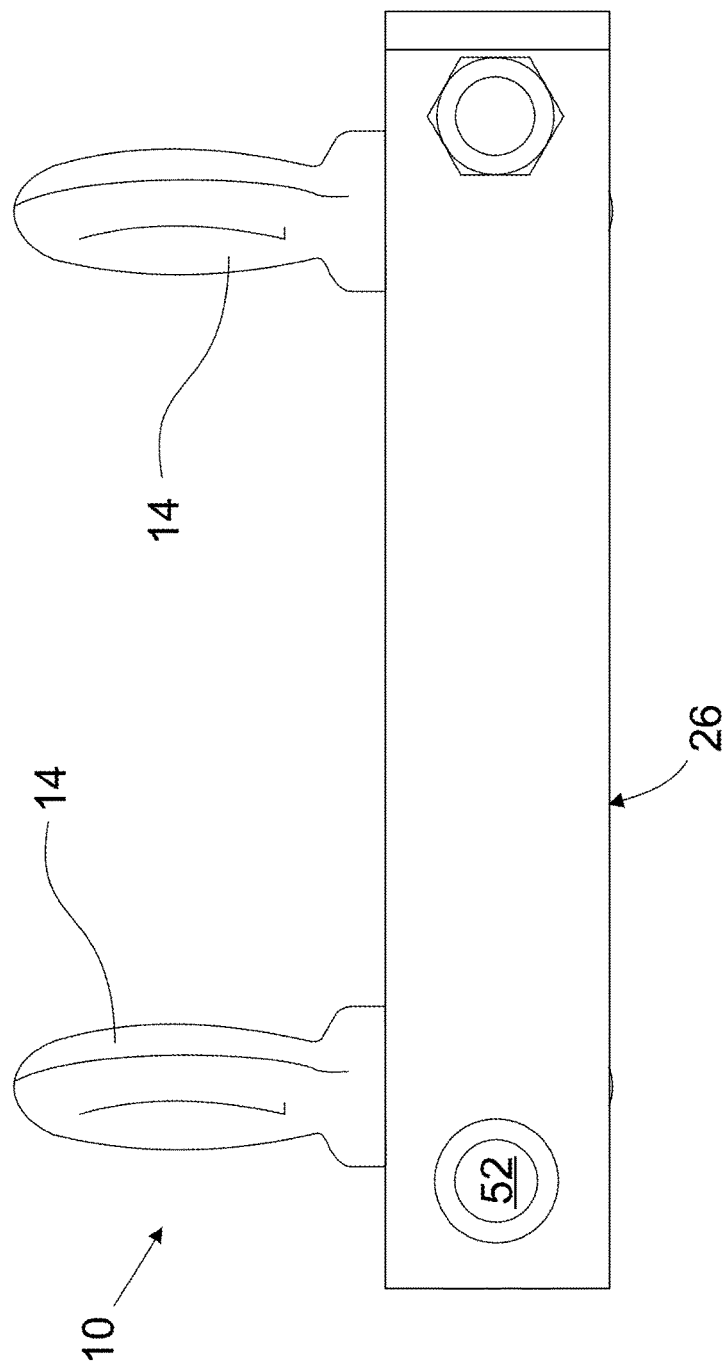
FIG. 5 depicts a side view of the clamp depicted in FIG. 1.
Figure 6:
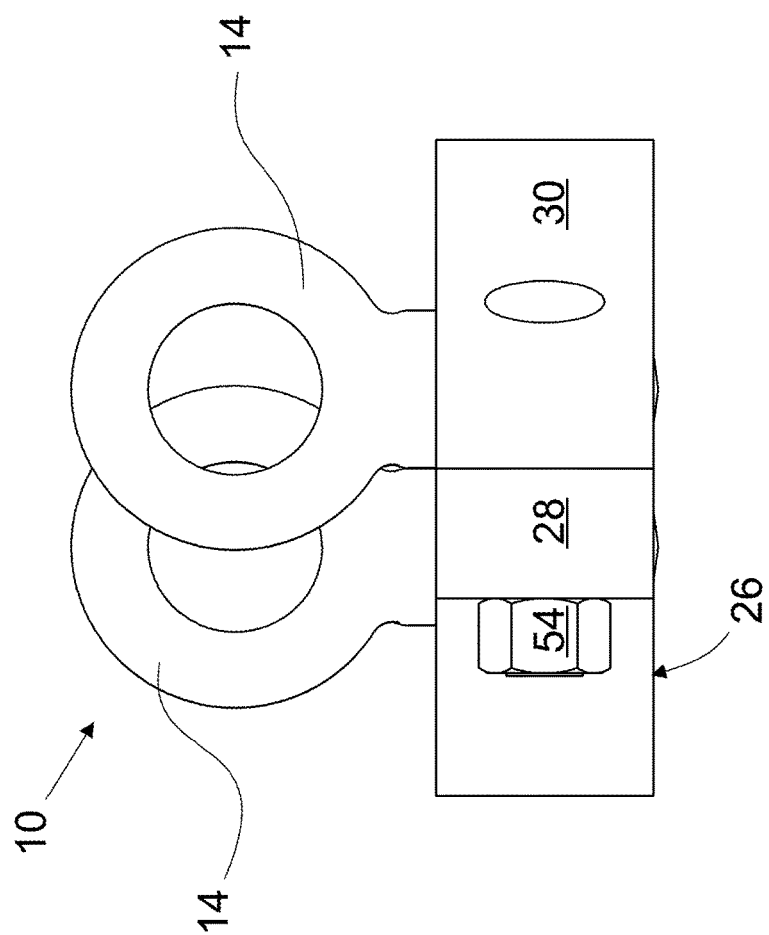
FIG. 6 depicts an end view of the clamp depicted in FIG. 1.
Figure 7:
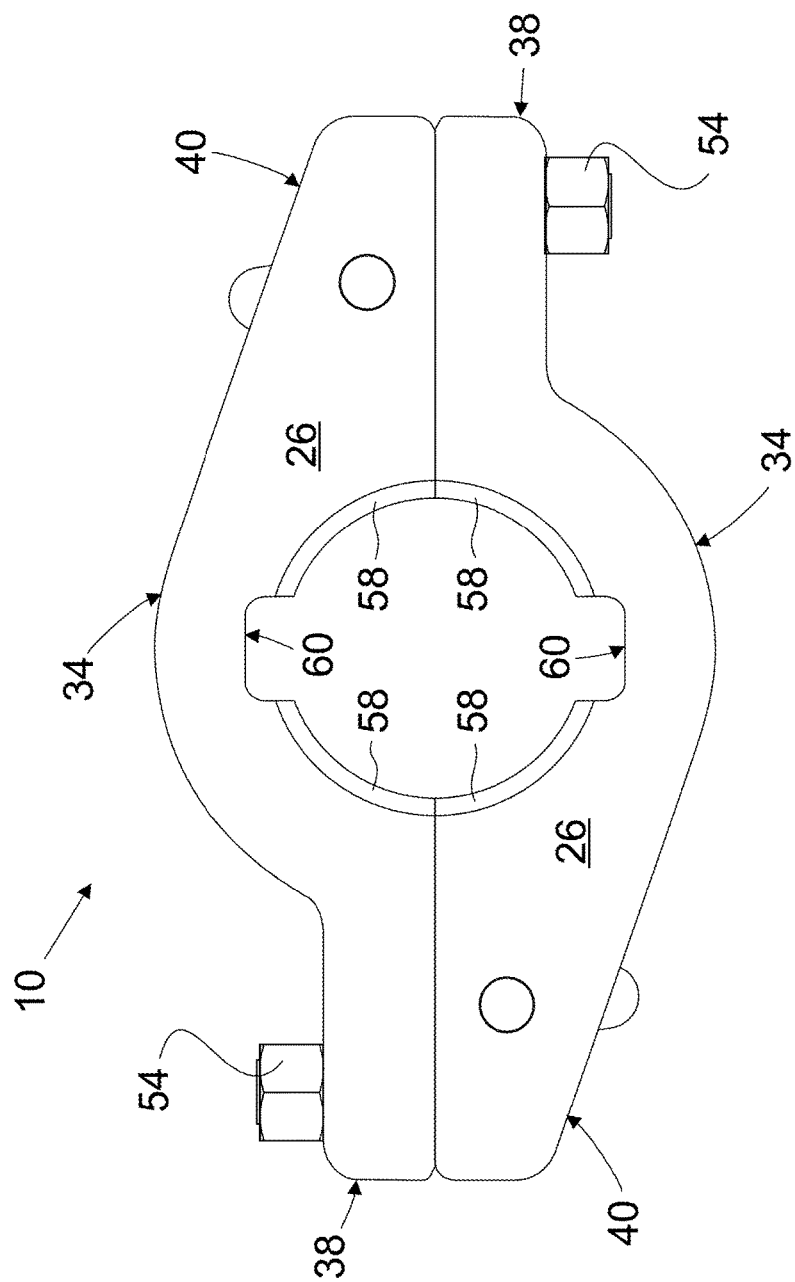
FIG. 7 depicts a bottom view of the clamp depicted in FIG. 1.

FIG. 1 depicts a side view of a clamp 10 according to one embodiment of the present disclosure supporting an apparatus such as a pump 12. As can be seen, the clamp 10 mounts around the circumference of the pump 12. The clamp 10 has eyelet rings 14 affixed to each end of the clamp 10. Removable chains 18 hanging down from a drilling mast or other support structure connect to the clamp 10 by attaching to the eyelet rings 14. The pump 12 may then be lowered into a drill hole and installed to pump out water, oil, or other liquid or gas.

FIGS. 2-7 depict various views of the clamp 10. As can be seen, the clamp 10 includes two coupling halves 20 and 22. The coupling halves 20 and 22 are typically identical or nearly identical. Similarity allows the coupling halves to be interchangeable, meaning there is only one part to be purchased, inventoried, and employed in the field.

As depicted in FIGS. 2-7, each coupling half 20 and 22 has a top 24, a bottom 26, a first end 28, and a second end 30. Each unitary coupling half 20 and 22 includes a central, arcuate body 34 with a rectangular flange 38 forming one end and an angled block 40 forming the other end. Generally semi-circular interior mounting surfaces 42 of each arcuate body 34 combine, when the clamp 10 is in use, to form a cylindrical void in the interior of the clamp, the void being sized to fit around the circumference of the pump 12.

In the embodiment depicted in FIGS. 1-7, each coupling half 20 and 22 is manufactured with a bolt hole 46 through the flange 38 and a lug bolt bore 48 through the angled block 40. Each coupling half 20 and 22 also has a threaded eyelet bore 50 formed in the top of the block 40. Typically, during manufacture of the coupling halves 20 and 22, a lug bolt 52 is permanently mounted in the lug bolt bore 48 and the eyelet ring 14 is permanently mounted in the eyelet bore 50. Such permanent mounting may take the form of a press-fit of the lug bolt 52, or of over-tightening of the threads of the lug bolt 52 and eyelet ring 14, or of applying adhesive chemicals to the lug bolt 52 or eyelet ring 14 just prior to threading the bolt or ring into the respective bore, or of screwing the eyelet ring 14 into the eyelet bore 50 and then welding the eyelet ring 14 to the coupling half at the correct orientation to allow proper loading of the eyelet ring 14, or similarly welding of the lug bolt 52 into the lug bolt bore 48. Although these mountings need not be permanent, by making the mountings permanent, the number of parts needed for "building" a clamp 10 is reduced to four: the two coupling halves 20 and 22 (each with the permanently mounted eyelet rings 14 and lug bolts 52) and two nuts 54 that are used to secure a coupling half 20 to the other coupling half 22.

Although in some embodiments, the diameter of the cylindrical void about in the interior of the clamp 10 may be sufficient to support the pump 12, typically one or more protrusions 58 are formed on the interior mounting surfaces 42 of each body 34. These protrusions are designed to mate with corresponding detents on the outer diameter of the pump 12 when the clamp 10 is mounted to the pump 12. Thus, the protrusions 58 help support the pump 12. Furthermore, gaps 60 between the protrusions 58 accommodate any pump wiring 62 (see FIG. 1) that needs to be lowered with the pump 12.

Figure 8:
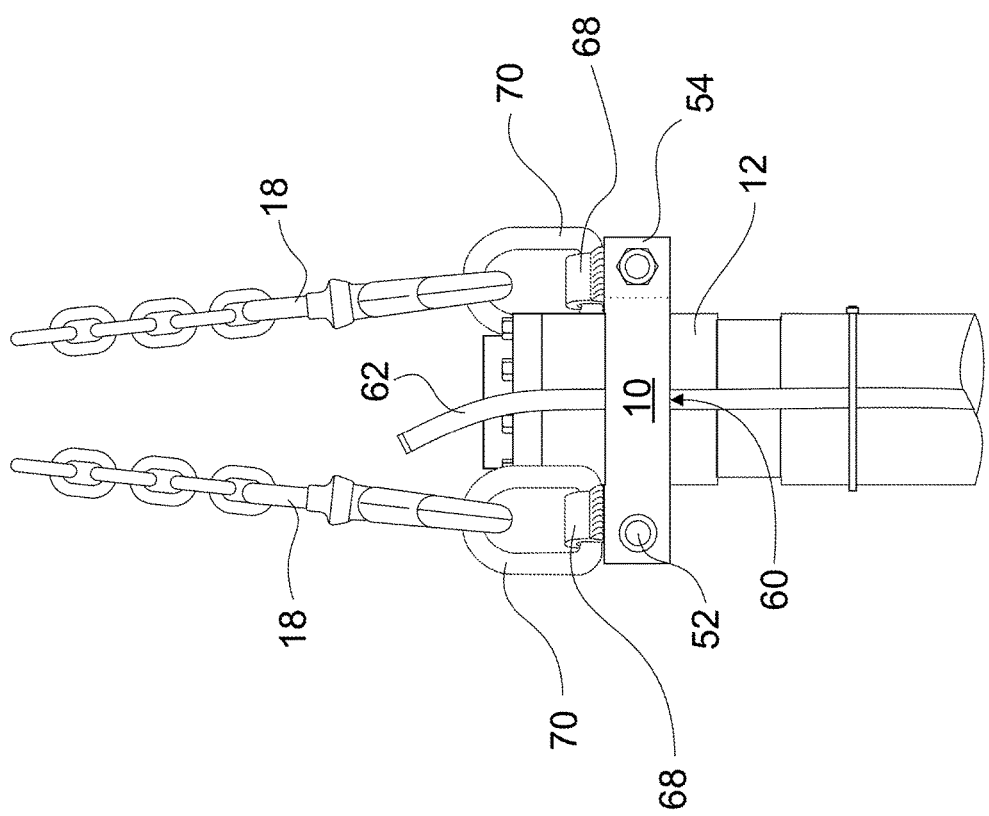
FIG. 8 depicts a side view of a second embodiment of the clamp of the present disclosure supporting a pump or other apparatus on a drilling mast or other support structure.
Figure 9:
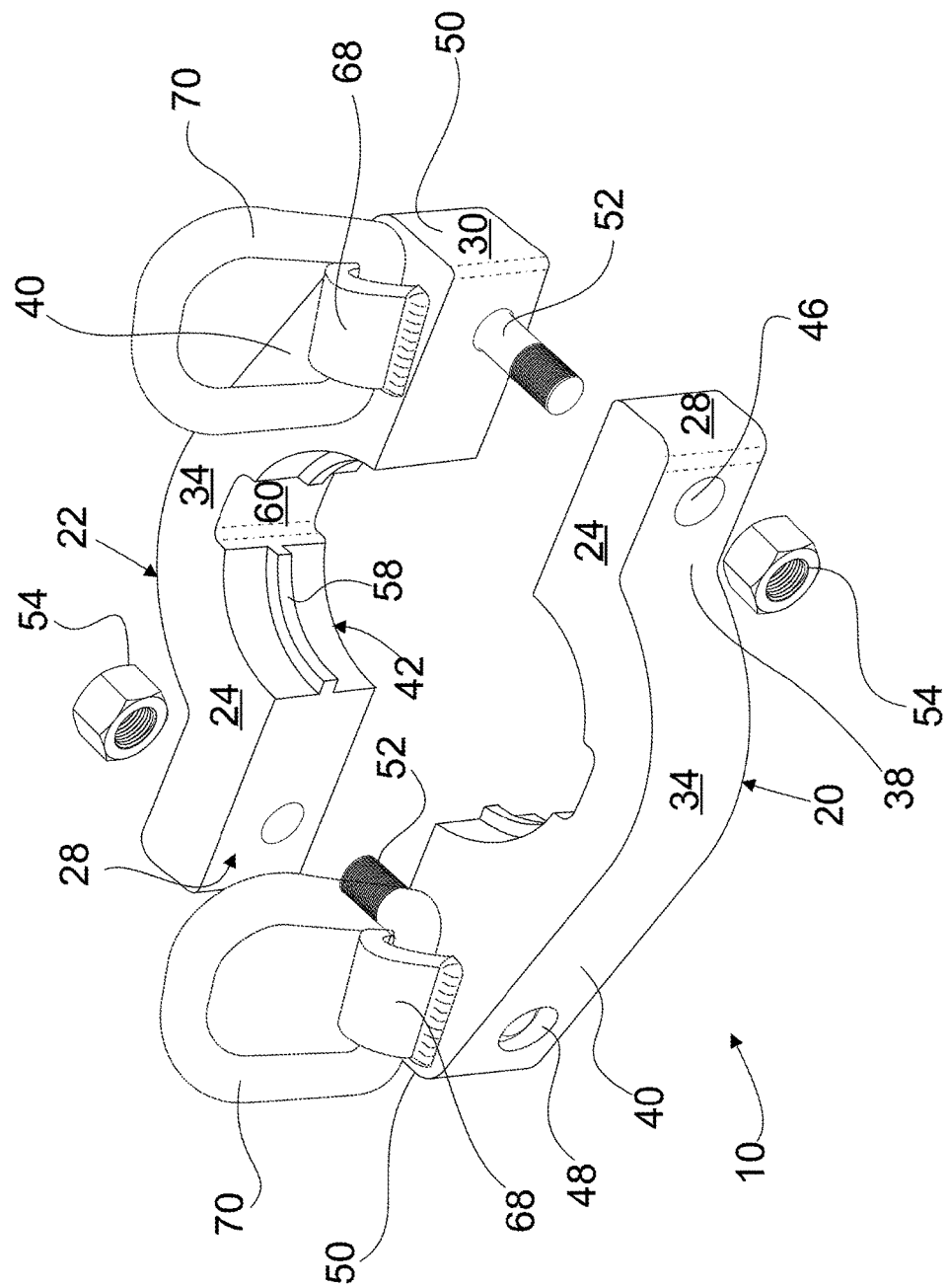
FIG. 9 depicts an exploded perspective view of the clamp depicted in FIG. 8.
Figure 10:
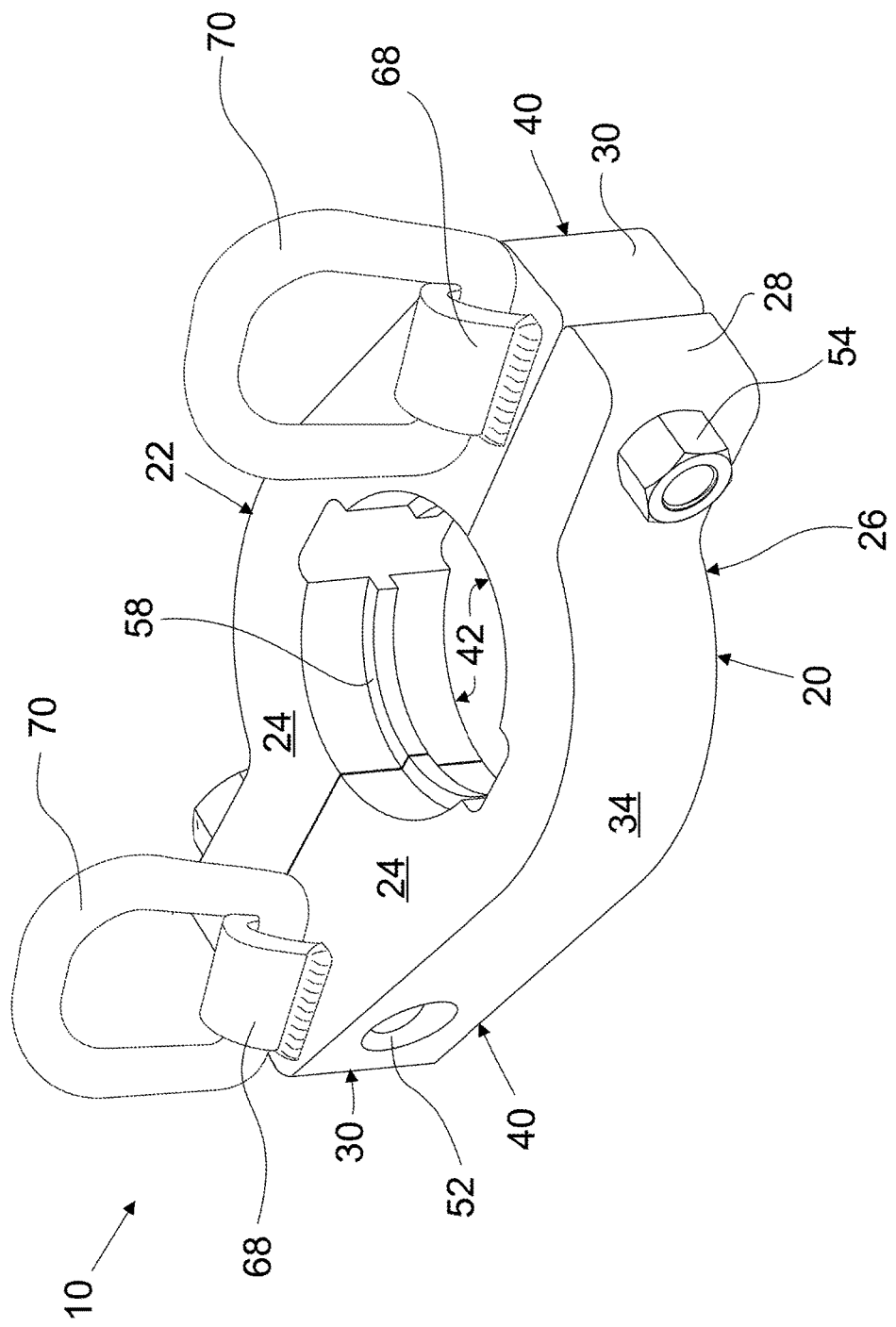
FIG. 10 depicts a perspective view of the clamp depicted in FIG. 8.
Figure 11:
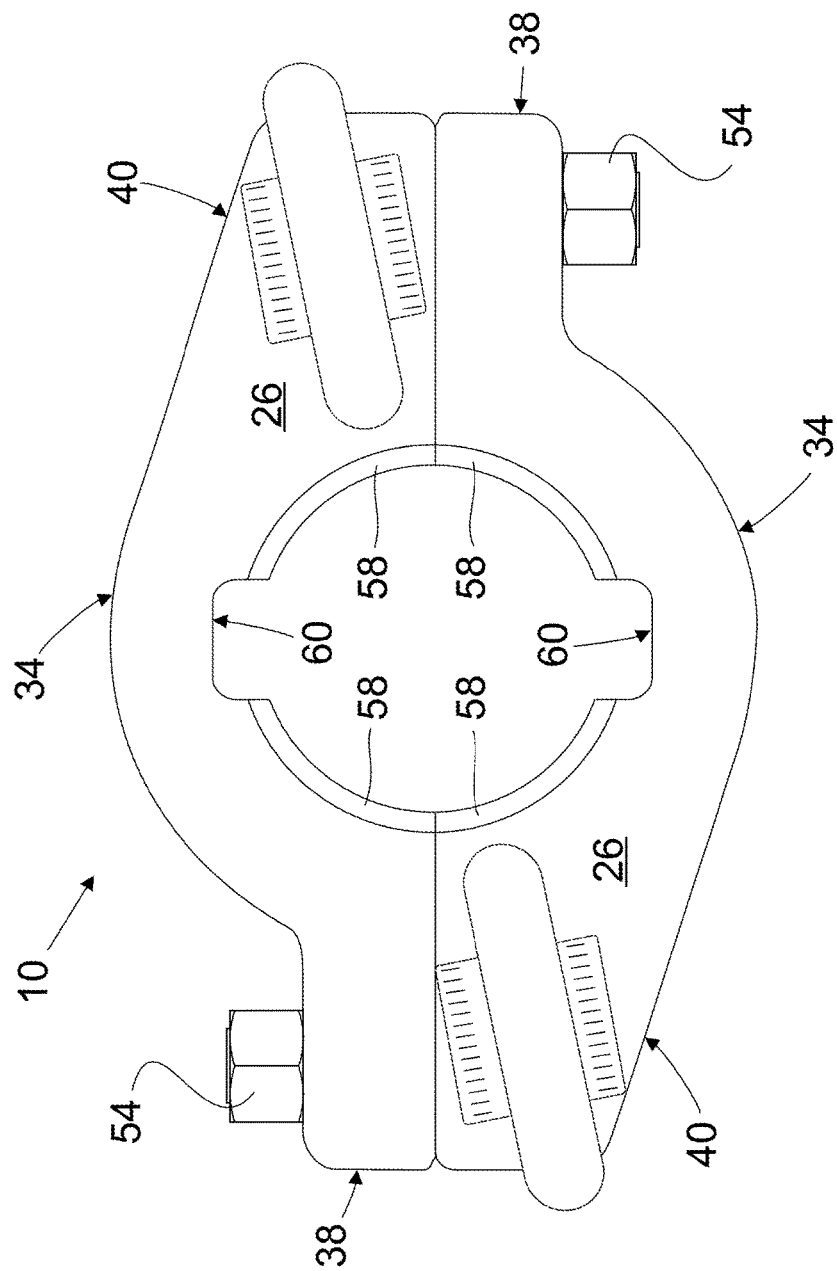
FIG. 11 depicts a top view of the clamp depicted in FIG. 8.
Figure 12:
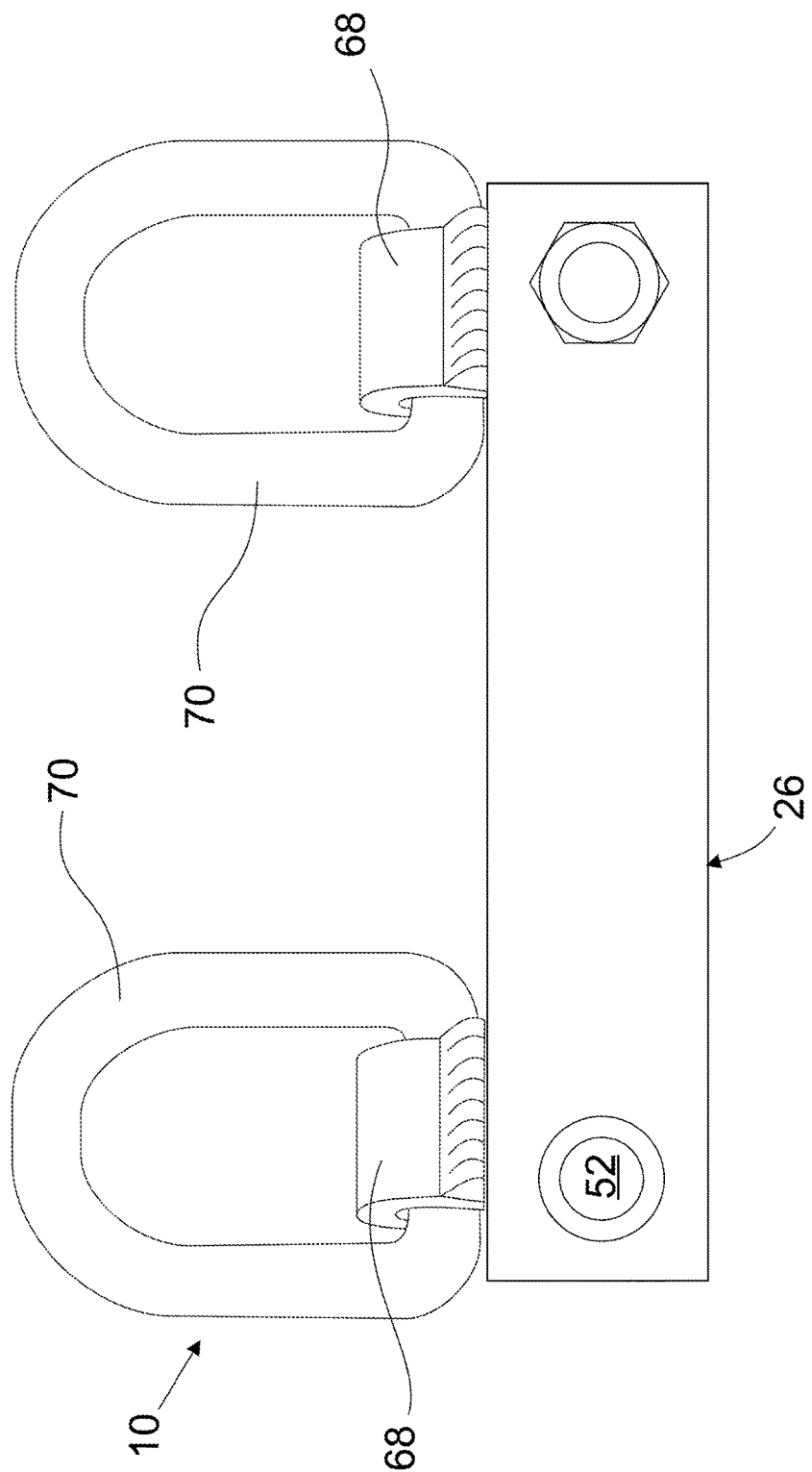
FIG. 12 depicts a side view of the clamp depicted in FIG. 8.
Figure 13:
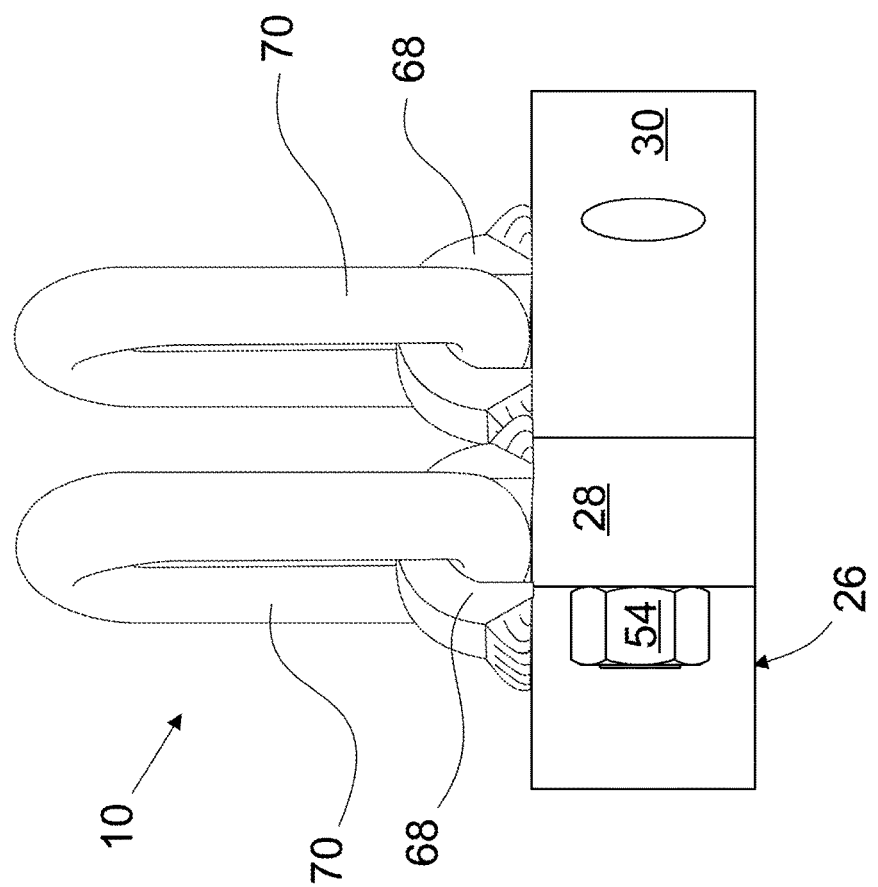
FIG. 13 depicts an end view of the clamp depicted in FIG. 8.
Figure 14:
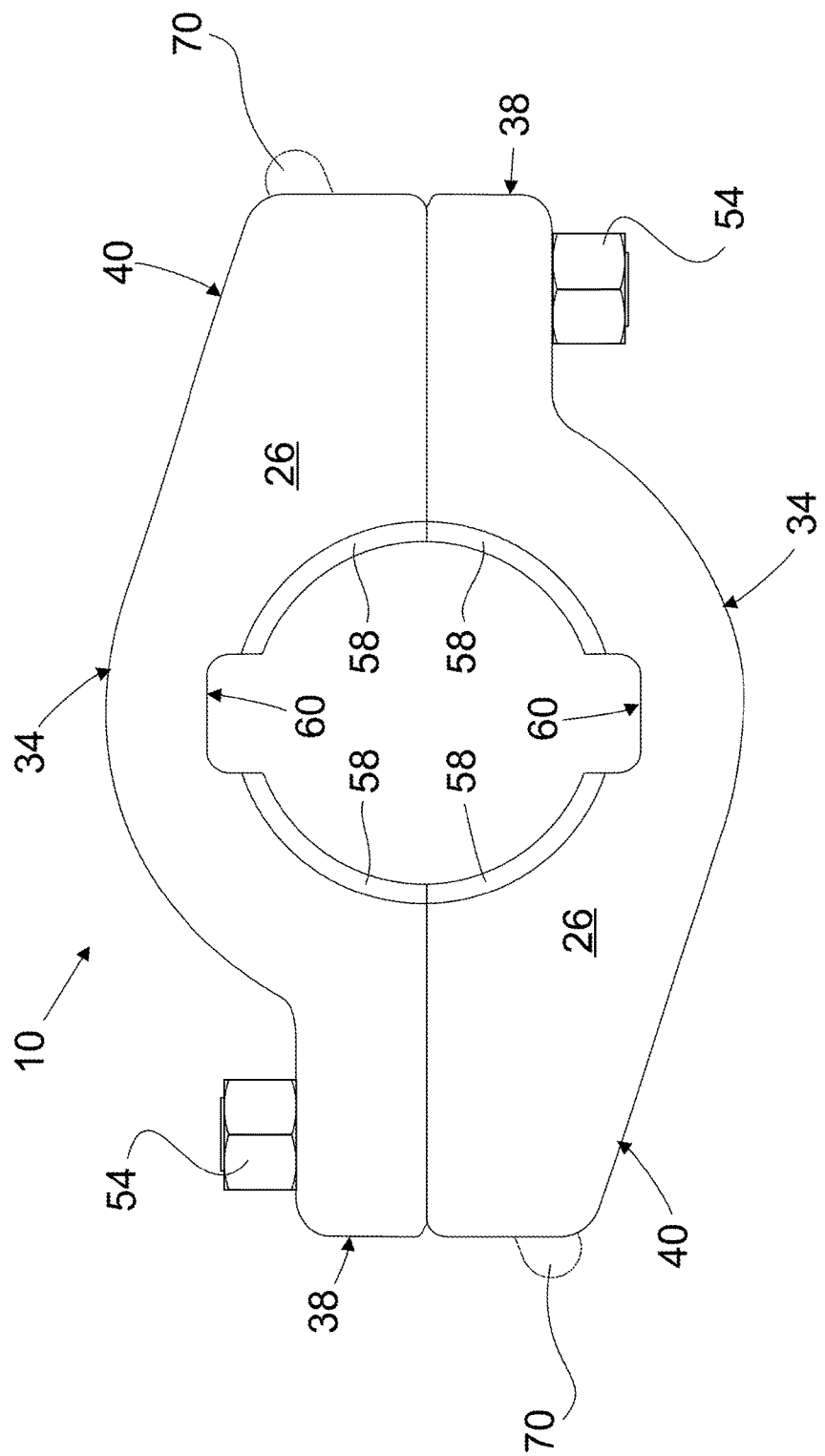
FIG. 14 depicts a bottom view of the clamp depicted in FIG. 8.

FIGS. 8-14 depict a clamp 10 according to another embodiment of the present disclosure. FIG. 8 depicts the clamp 10 according to this embodiment supporting a pump 12. Most of the elements of this embodiment are similar or identical to those of the embodiment previously discussed. In this embodiment, however, the clamp 10 has a pivoting link 68 welded or otherwise affixed to the top 24 of each clamp 10. The pivoting links 68 each hold a pivoting bail 70 that may pivot to extend up above the top of the clamp when in use.

Thus, as can be seen in FIG. 8, the clamp 10 mounts around the circumference of the pump 12. Removable chains 18 hanging down from a drilling mast or other support structure connect to the clamp 10 by attaching to the respective pivoting bails 70. The pump or other apparatus 12 may then be lowered into a drill hole and installed to pump out water, oil, or other liquid or gas.

FIGS. 9-14 depict various views of the clamp 10 according to this embodiment. As can be seen, again the clamp 10 includes two typically identical or nearly identical coupling halves 20 and 22. Similarity allows the coupling halves to be interchangeable, meaning there is only one part to be purchased, inventoried, and employed in the field.

As depicted in FIGS. 9-14, each coupling half 20 and 22 has a top 24, a bottom 26, a first end 28, and a second end 30. Each unitary coupling half 20 and 22 includes a central, arcuate body 34 with a rectangular flange 38 forming one end and an angled block 40 forming the other end. Generally semi-circular interior mounting surfaces 42 of each arcuate body 34 combine, when the clamp 10 is in use, to form a cylindrical void in the interior of the clamp, the void being sized to fit around the circumference of the pump 12.

In the embodiment depicted in FIGS. 8-14, each coupling half 20 and 22 is manufactured with a bolt hole 46 through the flange 38 and a lug bolt bore 48 through the angled block 40. Typically, during manufacture of the coupling halves 20 and 22, a lug bolt 52 is permanently mounted in the lug bolt bore 48. Such permanent mounting may take the form of a press-fit of the lug bolt 52, or of over-tightening of the threads of the lug bolt 52, or of applying adhesive chemicals to the lug bolt 52 just prior to threading the bolt into the bore 48, or welding of the lug bolt 52 into the lug bolt bore 48. In this embodiment, rather than an eyelet ring 14, a pivoting link 68 is permanently affixed to the top 24 of the block 40. The pivoting link 68 connects a pivoting bail 70 to the top of the block 40, replacing the eyelet ring 14, and dispensing with the need for forming an eyelet bore 50 in the block 40. Although these mountings need not be permanent, by making the mountings permanent, the number of parts needed for "building" a clamp 10 is reduced to four: the two coupling halves 20 and 22 (each with the permanently mounted lug bolts 52 and pivoting links 68) and two nuts 54 that are used to secure a coupling half 20 to the other coupling half 22.

Careful comparison of the embodiment of the clamp 10 depicted in FIGS. 1-7 and the embodiment depicted in FIGS. 8-14 shows that the shape of the clamp 10 of FIGS. 8-14 is slightly shorter in length than the clamp 10 depicted in FIGS. 1-7. This shorter clamp 10 of FIGS. 8-14 is possible because there is no threaded eyelet ring 14 in the embodiment of FIGS. 8-14. There being no eyelet ring 14, there is no need to slightly lengthen the clamp 14 to allow space for the eyelet ring threads to go through the clam 10. Instead, as indicated by review of FIG. 9, the pivoting link 68 may be welded directly "above" the bolt hole 46 and the lug bolt 52. This results in using less material for the clamp 10, making it lighter in weight and safer.

Although in some embodiments, the diameter of the cylindrical void about in the interior of the clamp 10 may be sufficient to support the pump 12, typically one or more protrusions 58 are formed on the interior mounting surfaces 42 of each body 34. These protrusions are designed to mate with corresponding detents on the outer diameter of the pump 12 when the clamp 10 is mounted to the pump 12. Thus, the protrusions 58 help support the pump 12. Furthermore, gaps 60 between the protrusions 58 accommodate any pump wiring 62 (see FIG. 8) that needs to be lowered with the pump 12.

Figure 15:
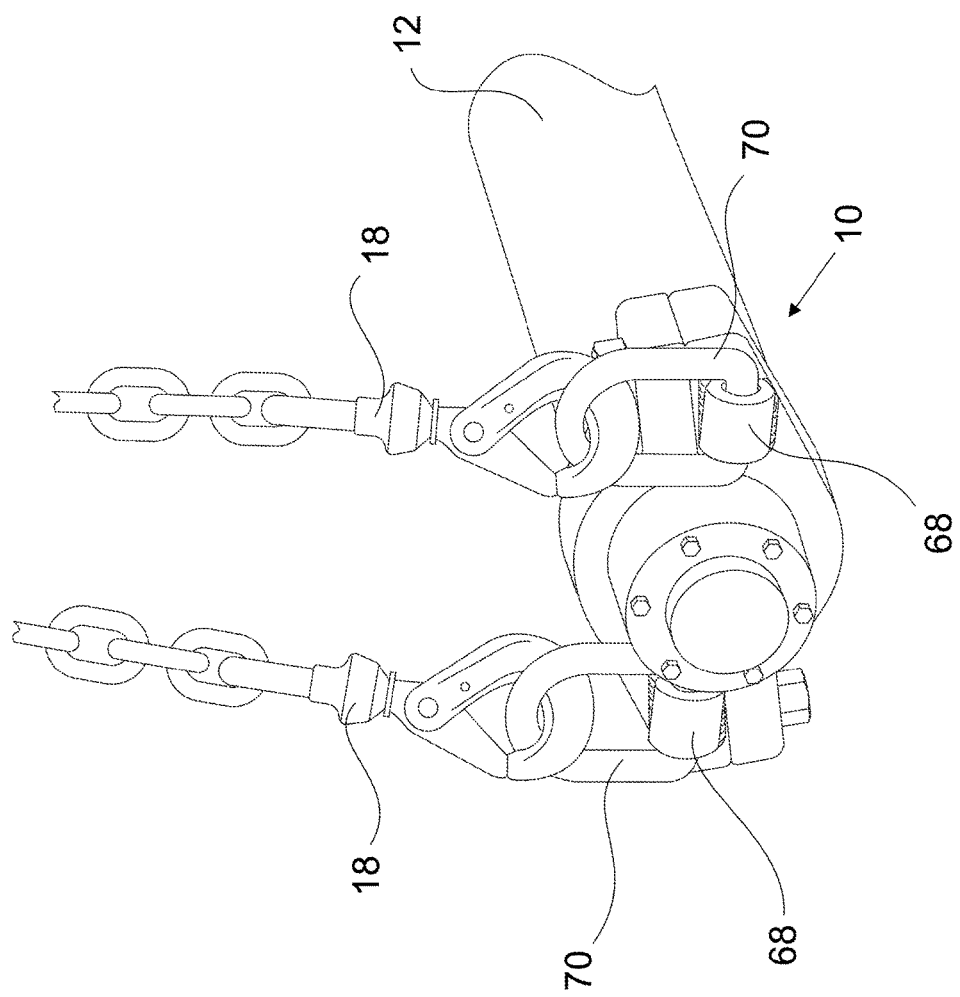
FIG. 15 depicts another embodiment of the clamp of the present disclosure mounted to a drilling shaft in the initial lifting position.

FIG. 15 depicts a third embodiment of the present clamp 10. In this embodiment, the clamp 10 still has the general dimensions of the clamp 10 depicted in FIGS. 1-7, but instead of the eyelet bolt 14, the clamp 10 depicted in FIG. 15 includes the pivoting link 68 and pivoting bail 70 as depicted in FIGS. 8-14. If these dimensions are used, a coupling half 20 from a clamp 10 according to the embodiment depicted in FIGS. 1-7 could be used with a coupling half 22 from a clamp 10 of the embodiment depicted in FIGS. 1-7 to support a pump 12 or other apparatus.

To build a clamp 10 in the field, a worker thus takes two couplings halves 20 and 22, rotates one of the halves 180 degrees, and places the two coupling halves 20 and 22 about the diameter of the pump 12 with the eyelet rings 14 or the pivoting bails 70 facing upward, making sure that the protrusions 58 align with corresponding detents in the pump exterior surface, as shown in FIG. 15. In so doing, the two lug bolts 52 are inserted into the bolt holes 46 of the opposing coupling half. The worker threads a nut 54 unto each lug bolt 52, tightening the nut 54 to ensure the two coupling halves 20 and 22 will stay attached. As depicted in FIGS. 1, 8, and 15, chains 18 are affixed to the eyelet rings 14 or to the pivoting bails 70 (depending on the embodiment of coupling half 20 or 22 in use), and the pump 12 or other apparatus may then be lifted and lowered using any other lifting and support items available or desired.

The unitary coupling halves 20 and 22 are typically made from high quality steel. However, other materials may be used, such as ceramics or composites or other metals. The decision of what materials to use will typically involve considerations such as weight of the pump, strength of the material to be used, corrosion considerations, and other factors as known in the art.

Although depicted in the drawings as being generally cylindrical, the clamp 10 could have other shapes or could have various dimensions, depending on the specific requirements or applications involved, such as weight and size and such matters. Hence, it will be appreciated by those skilled in the art that various clamp 10 designs and various lug bolt bore 48 and eyelet bore 50 or pivoting link 68 and pivoting bail 70 configurations exist that meet the functionality requirements of the various pumps and motors supported by the clamp 10. Although particular embodiments of the present invention have been described, those of skill in the art will appreciate that various modifications and changes may be made by those skilled in the art without departing from the spirit and scope of the invention. The present invention may be embodied in other specific forms without departing from its structures, methods, or other essential characteristics as broadly described herein and claimed hereinafter. The described embodiments are to be considered in all respects only as illustrative, and not restrictive.

The invention claimed is:

1. A clamp for suspending an apparatus, the clamp comprising:
   two substantially identical coupling halves, each coupling half comprising:
   a flange on a first end of the coupling half, the flange being generally rectangular in cross-section and having a relatively flat terminating end, a top, and a bottom, a flat inside mating face, and a flat outside face, the flange further comprising a pre-formed bolt hole that passes through the flange from the inside mating face to the outside face;
   a body having a top and a bottom, the body having a semi-circular interior mounting surface of a predetermined diameter and thereby forming a semi-circular cylinder portion having an axis, the interior mounting surface including a semi-circular protrusion extending into the predetermined diameter along the interior mounting surface, the protrusion being configured to mate with a circular groove on the apparatus to suspend the apparatus when the clamp is in use, the body further comprising an exterior side that forms an arc of predetermined length as the body extends arcurately away from the flange and then transitions along a predetermined tangent line after at least a quarter circle of exterior side curvature, thereby causing the exterior side to increase thickness of the body as measured from the interior mounting surface to the exterior side;
   a block on a second end of the coupling half, the block having a top, a bottom, and a relatively flat terminating end, a flat inner mating face, and an angled outer face that is an extension of the tangent line, the block having a pre-formed lug bolt bore that passes through the block from the outer face to the inner mating face; and
   a lug bolt permanently mounted in the lug bolt bore;
   the clamp further comprising a pair of lug nuts for connecting the two coupling halves with the lug bolts of each coupling half inserted into the lug bolt hole of the other coupling half rotated 180 degrees from its mating coupling half and the lug nuts removably threaded onto the lug bolts.

2. The clamp of claim 1 further comprising a pre-formed eyelet bore formed in the top of the block and an eyelet ring permanently mounted in the eyelet bore with the eyelet ring extending up from the eyelet bore.

3. The clamp of claim 1 further comprising a pivoting link permanently mounted to the top of the block and a pivoting bail held to the top of the block and pivotal to extend up from pivoting link.

4. A clamp for lifting an apparatus, the clamp comprising:
   two coupling halves, each unitary coupling half comprising:
   a flange on a first end of the coupling half, the flange having a terminating end, a top, a bottom, an inside mating face, and an outside face, the flange comprising a bolt hole that passes through the flange from the inside mating face to the outside face;

a central body having a top and a bottom, the body having an interior mounting surface of a predetermined size and shape, the interior mounting surface including a protrusion configured to mate with a groove on the apparatus when the clamp is in use;

a block on a second end of the coupling half, the block having a top, a bottom, a terminating end, an inner mating face, and an outer face, the block having a pre-formed lug bolt bore that passes through the block from the outer face to the inner mating face; and means for connecting the block to a lifting mechanism, the means comprising at least one of:
  a pre-formed eyelet bore formed in the top of the block and an eyelet ring permanently mounted in the eyelet bore with the eyelet ring extending up from the eyelet bore: or
  a pivoting link permanently mounted to the top of the block and a pivoting bail held to the top of the block and pivotal to extend up from pivoting link;

the clamp further comprising a pair of lug nuts for connecting the two coupling halves with a lug bolt for each coupling half inserted into the lug bolt hole of the other coupling half rotated 180 degrees from its mating coupling half and the lug nuts removably threaded onto the lug bolts.

5. The clamp of claim 4 further comprising a lug bolt permanently mounted in the lug bolt bore.

6. A lifting clamp coupling half comprising:

a flange on a first end of the coupling half, the flange having an inside mating face, and an outside face, the flange comprising a bolt hole that passes through the flange from the inside mating face to the outside face;

a central body having an interior mounting surface that includes a protrusion; and a block on a second end of the coupling half, the block having an inner mating face, and an outer face, the block having a pre-formed lug bolt bore that passes through the block from the outer face to the inner mating face; and means for connecting the block to a lifting mechanism, the means comprising at least one of:
  a pre-formed eyelet bore formed in the top of the block and an eyelet ring permanently mounted in the eyelet bore with the eyelet ring extending up from the eyelet bore: or
  a pivoting link permanently mounted to the top of the block and a pivoting bail held to the top of the block and pivotal to extend up from pivoting link.

7. The coupling half of claim 6 further comprising a lug bolt permanently mounted in the bolt bore.

8. The coupling half of claim 6 further comprising at least one lug nut for connecting the coupling half to a second coupling half.

* * * * *